7 Sheets--Sheet 3.

B. C. STEVENS.
Knitting-Machines.

No. 148,388. Patented March 10, 1874.

WITNESSES.

INVENTOR.

7 Sheets--Sheet 4.

B. C. STEVENS.
Knitting-Machines.

No. 148,388.                                   Patented March 10, 1874.

WITNESSES.                                     INVENTOR.

7 Sheets--Sheet 5.

B. C. STEVENS.
Knitting-Machines.

No. 148,388. Patented March 10, 1874.

WITNESSES.
E. N. Johnson
J. P. Crawford

INVENTOR.
B. C. Stevens

7 Sheets--Sheet 6.
B. C. STEVENS.
Knitting-Machines.
No. 148,388.    Patented March 10, 1874.
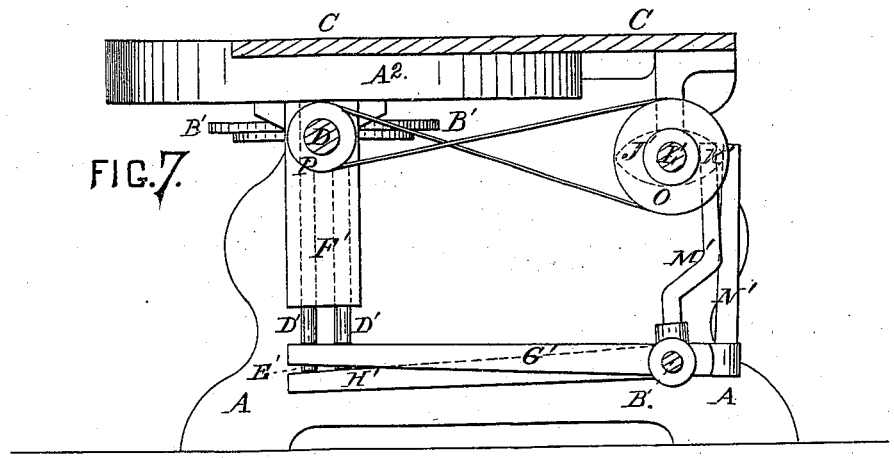
FIG. 7.
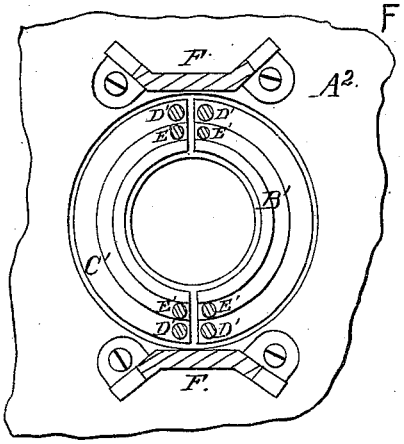
FIG. 8.
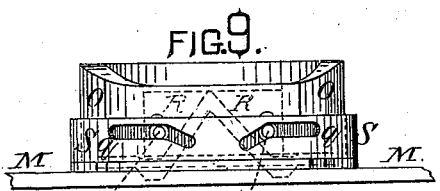
FIG. 9.
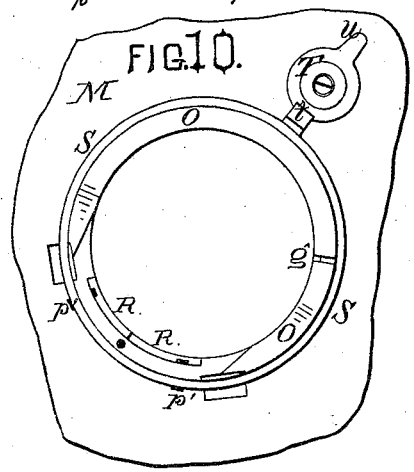
FIG. 10.
FIG. 12.
WITNESSES.    INVENTOR.

7 Sheets--Sheet 7.

B. C. STEVENS.
Knitting-Machines.

No. 148,388.            Patented March 10, 1874.

WITNESSES.            INVENTOR.

UNITED STATES PATENT OFFICE.

BENJAMIN C. STEVENS, OF FRANKLIN, NEW HAMPSHIRE, ASSIGNOR TO J. S. SHALER, OF BOSTON, MASSACHUSETTS, AND WILLIAM COREY, OF MANCHESTER, NEW HAMPSHIRE.

IMPROVEMENT IN KNITTING-MACHINES.

Specification forming part of Letters Patent No. 148,388, dated March 10, 1874; application filed September 5, 1873.

*To all whom it may concern:*

Be it known that I, BENJAMIN C. STEVENS, of Franklin, in the county of Merrimack and State of New Hampshire, have invented a new and Improved Knitting-Machine, of which the following is a specification:

Knitting-machines for knitting what is generally known as the "Shaker sock" have been so constructed, arranged, and operated as to knit a continuous tubular or hose-like piece of the desired diameter, which is then cut into proper lengths, and each length slit on one side, in which a heel was either knit in by hand, or the fabric was transferred to another machine, and the heel-piece knit on and then sewed up to complete the heel.

My invention is designed to obviate the trouble and delay incident to the above-described process; and consists in a combination of devices with a grooved cylinder and dial, whereby both a continuous circular and a reciprocating semicircular motion are imparted, the latter motion continuing the knitting upon one half of the fabric, while that on the other half is suspended, thus producing a heel. It further consists in a novel construction, combination, and arrangement of parts, whereby the dial and the mechanism attached thereto can be readily disconnected from the other working parts of the machine, whereby a plain foot can be knit in connection with a ribbed leg, which kind of foot is more desirable, less elastic, and retains its shape better than if it were ribbed. It further consists in a combination and arrangement of parts to effect the change from continuous rotary to reciprocating semicircular motion.

Figure 1:
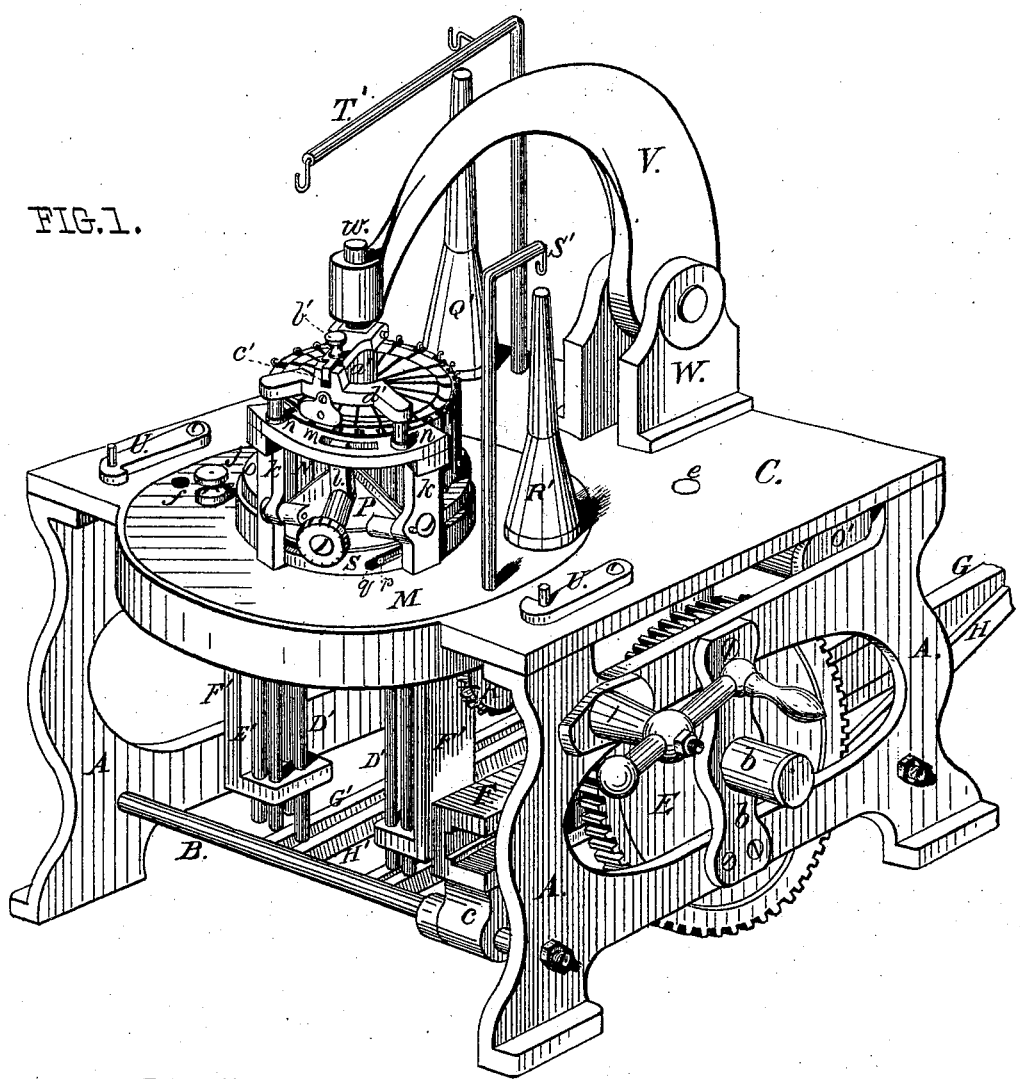
Figure 2:
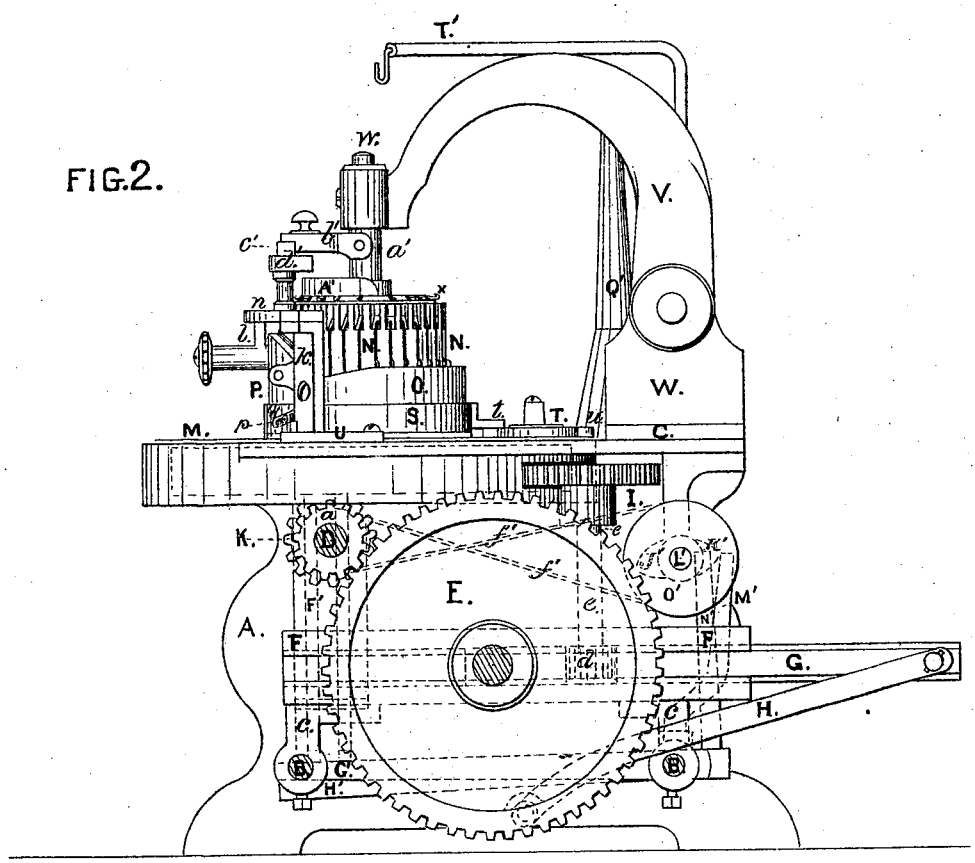
Figure 3:
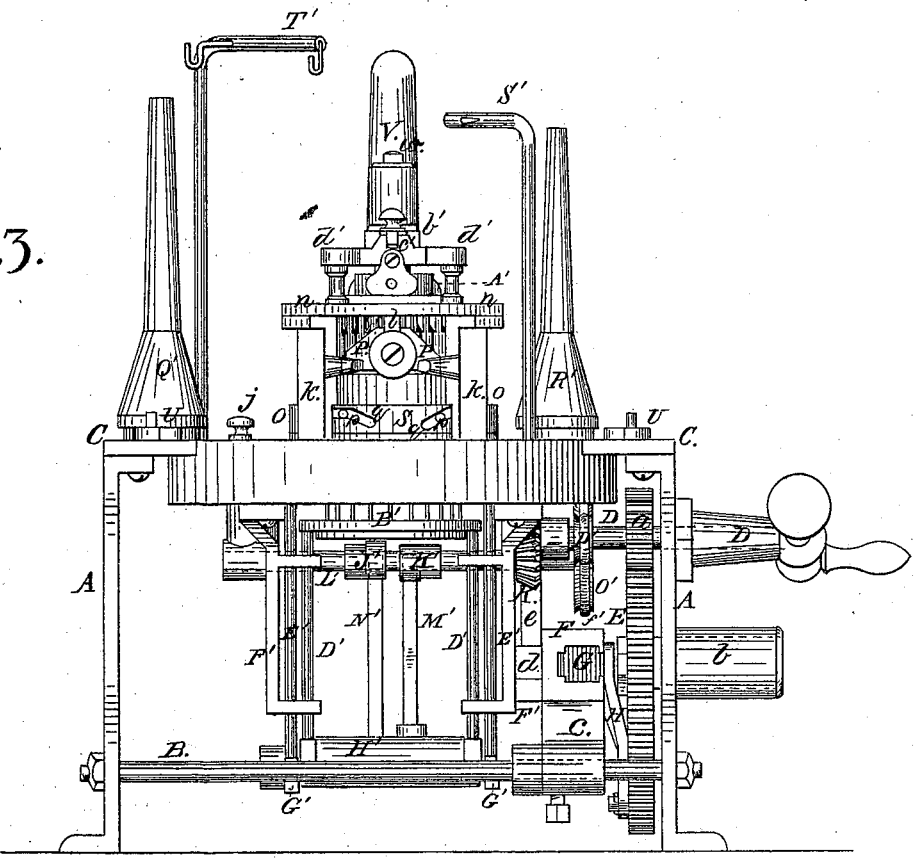
Figure 4:
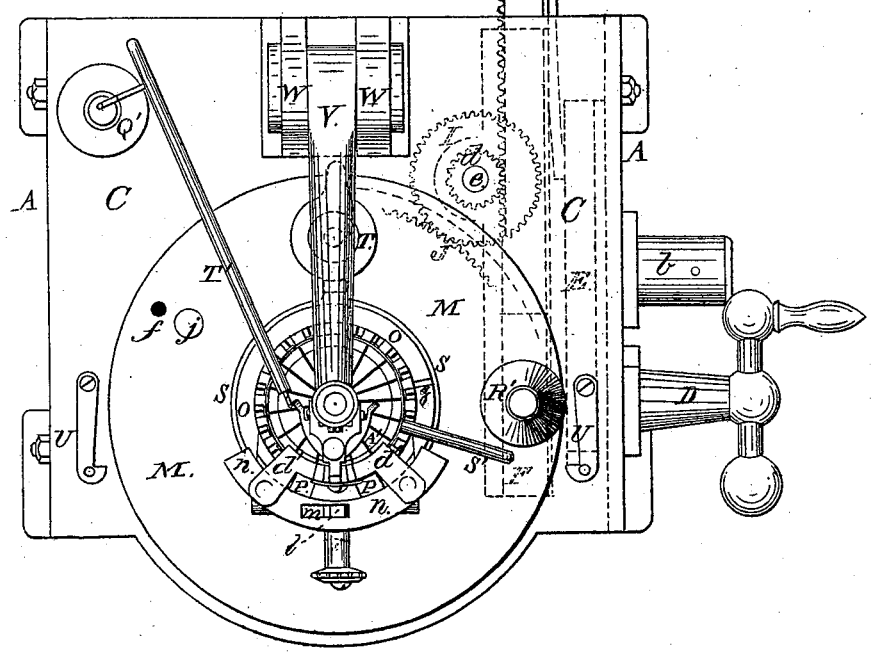
Figure 5:
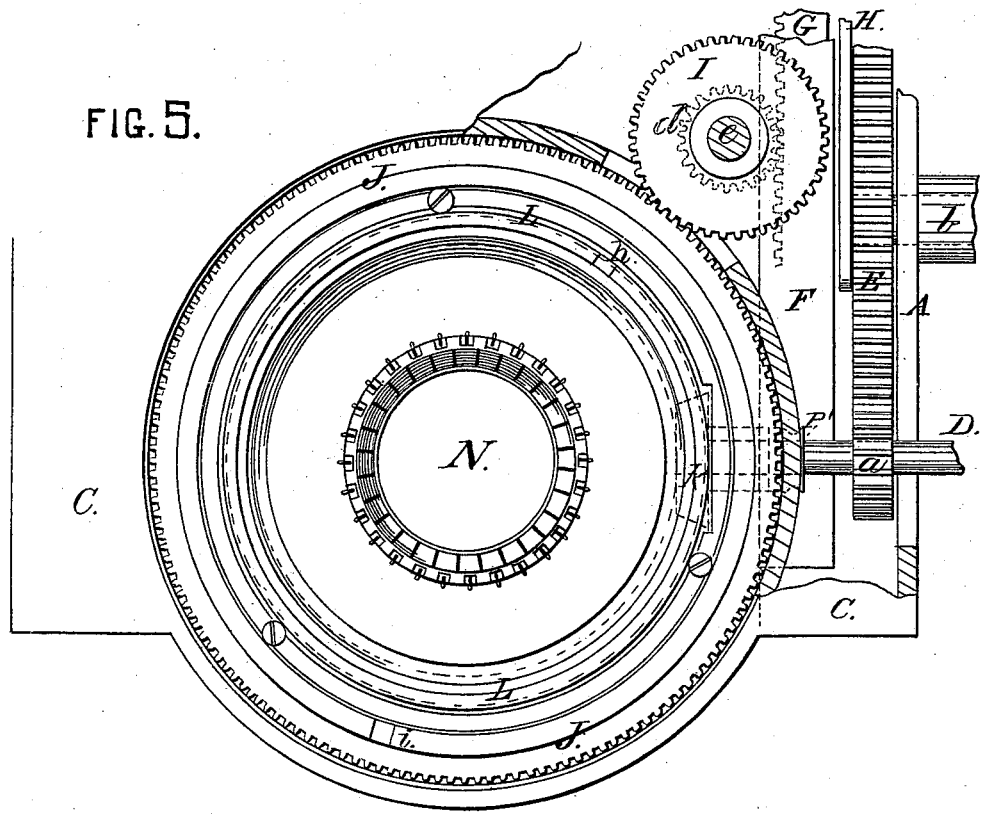
Figure 6:
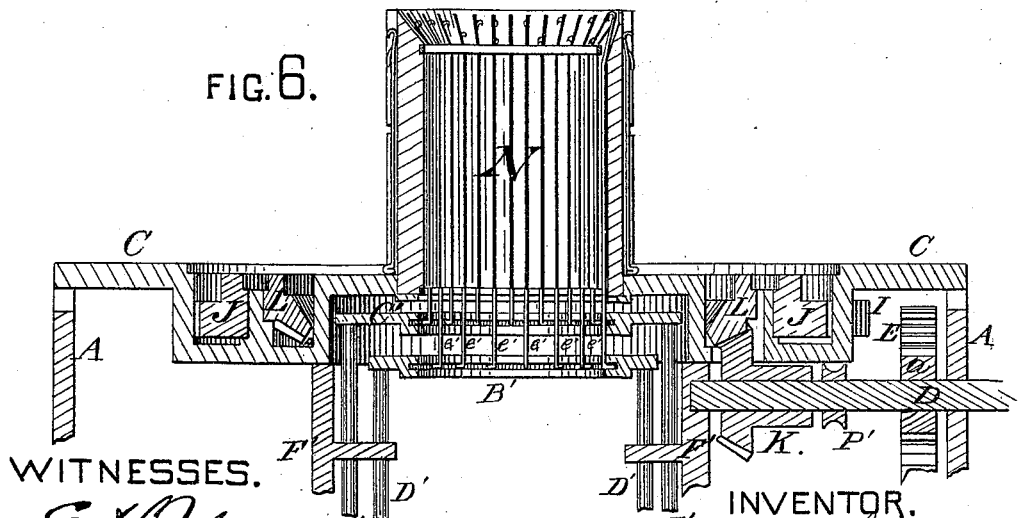

Figure 1 is a perspective view; Fig. 2, a side elevation; Fig. 3, a front elevation; Fig. 4, a plan or top view. Fig. 5 is a top view with the plate M removed. Fig. 6 is a vertical section of Fig. 5. Fig. 7 shows the mechanism for operating the advancing hooks. Fig. 8 is a section of a portion of Fig. 7.

The remaining figures are parts in detail, which will be alluded to hereafter.

A A represent the side frames of the machine, which are held together by the cross-rods B B and table C. D is the driving-shaft, carrying a pinion, $a$, which gears with the large wheel E, working in the bearing $b$, secured to the side frame. Behind this wheel is a long box or guide, F, supported on bearings $c\ c$, secured on the cross-rods B B, in which box a rack-bar, G, slides, and is reciprocated, by the large wheel E, by means of the pitman H, which is connected, at one extremity, to the wheel E, and at the other to the rack G. The teeth of the rack G mesh with a pinion, $d$, on the arbor $e$, and, as it is reciprocated, this arbor receives rotary motion first in one direction and then in the other. To the upper extremity of the arbor $e$ is secured a pinion, I, which gears with a gear-ring, J, (see Figs. 4 and 5,) and reciprocates it in a semicircle. To the driving-shaft D is secured a bevel-pinion, K, which meshes with the toothed ring L, and, as the shaft revolves, this ring receives a continuous rotary motion.

From the foregoing it will be seen that the revolution of the driving-shaft D causes a reciprocating semicircular motion in the outer ring, J, and a continuous circular motion in the inner one, L.

M is a circular plate, which is free to revolve about the needle-cylinder N, and has cast to it a short cylinder or annulus, O, which encircles the needle-cylinder, and has a cam-groove cut in its interior, by which the needles are operated, as hereafter described. This plate M covers the circular chamber in which the rings J L revolve, and can be connected with either of them by means of the catch-pin $j$, which passes through the holes $f\ g$ in the plate M, and enters the slots $h\ i$ in the rings. Thus, by connecting the plate with the outer ring, the reciprocating semicircular motion of the latter is imparted to it, and, by changing the catch $j$ to the inside hole, it will enter the slot in the ring L, which has a continuous rotary motion, and the plate will be revolved continuously.

Figure 15:
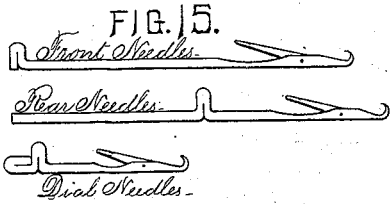
Figure 16:
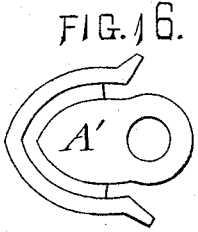

The needle-cylinder is grooved, as shown, both internally and externally, and in the grooves the needles, the construction of which is shown at Fig. 15, Sheet 7, are inserted. The cylinder-needles are divided into two sets, each set occupying one-half the circumference of the cylinder, and being operated by a separate cam. The set occupying the front portion of the cylinder is operated by the cam-groove and cams in the annulus cast to the plate, (see Figs. 8 and 11,) while the set occupying the rear half of the cylinder is operated by the hinged cam P.

Figure 11:
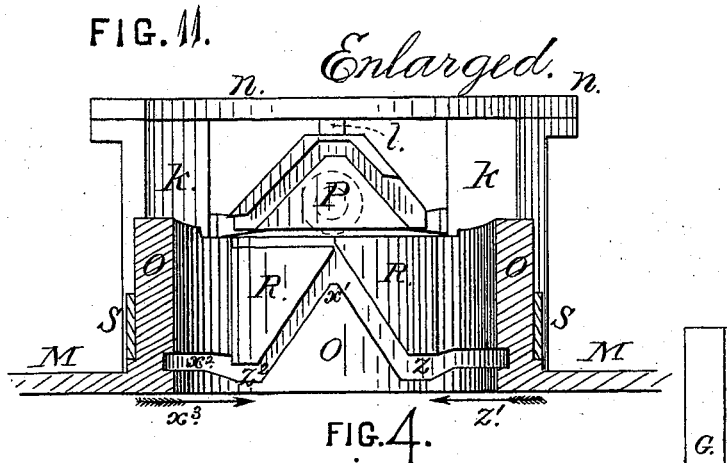

Different views of this cam are shown in all the first four sheets of drawings, but particularly in Fig. 11, where the groove cut in its interior surface is plainly shown. This cam is pivoted to the two uprights $k\ k$, secured to the plate M. It can be thrown down out of the way, and is secured in position by the latch $l$, which is turned up into the slot $m$ in the segment $n$.

Figure 13:
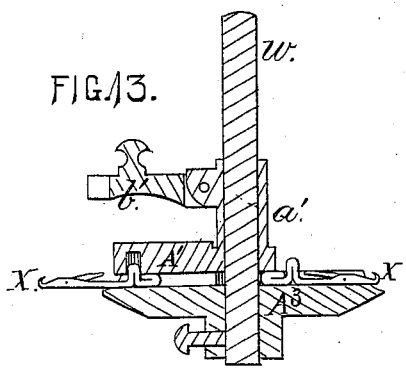
Figure 14:
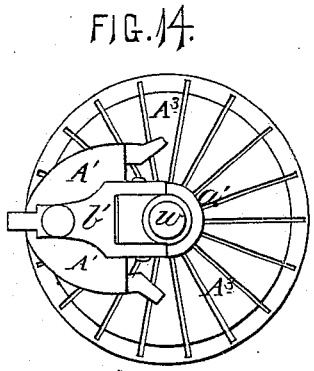

By reference to Figs. 3, 9, 10, 11, and 12, the construction of the cam-groove and cams on the interior of the annulus or cylinder O, which surrounds the needle-cylinder, will be clearly seen. R R are triangular cams, which have a short vertically-reciprocating motion in the slots cut in the annulus O, through which slots the studs $p$ on the cams R R pass, and enter the slots $q\ q$ in the ring or hoop S, which encircles the annulus O. These slots $q\ q$ are inclined at one end, and as the hoop S is turned the inclines either raise or depress the triangular cams R R. The ring S is operated by the shifter T, pivoted on the plate M. One end of this shifter is provided with a pin, which enters a slot on the under side of the projection $t$, affixed to the hoop S, while the other end is formed into a teat or projection, $u$, which, as the plate is reciprocated, comes in contact, at the end of each reciprocation, with the stops U U, secured on each side of the table of the machine, and shifts the cams R R by turning the hoop S. The stops U U can be thrown back out of the way when it is desired to give the plate M a continuous rotary motion. V is a curved arm hinged to the bearing W, and carrying at its outer extremity a disk or dial, $A^3$, provided with grooves radiating from its center, in which are inserted the needles X, Fig. 15. Immediately over this dial, turning on the spindle $w$, (see Figs. 13 and 14,) is a cam, $A^1$, which, as it is rotated, operates the needles in the dial-grooves. Hinged to the sleeve $a^1$ of this cam is an arm, $b^1$, serving as a catch, which enters the slot $c^1$ in the cross-piece $d^1$; and as the plate M is revolved, the cam $A^1$ is also carried around on the dial, thus operating the needles. B′ B′ C′ C′ are semicircular segments, to which the hooks $e'\ e'$, occupying the interior grooves of the needle-cylinder, are attached. To these segments are secured the rods D′ D′ E′ E′, which pass through the standards F′ F′, attached underneath the ring-chamber $A^2$. G′ H′ are arms or levers, which turn on one of the cross-rods B, and are operated by the cams J′ K′ on the shaft L′, acting against the bars M′ N′, attached to the arms. The cams J′ K′ are similar in shape, but set in opposite positions. To the shaft L′ is attached a grooved pulley, O′, which receives motion from the pulley P′ on the driving-shaft and the belt $f'$; and as the shaft L′ is rotated, the cams J′ K′ operate the levers G′ H′, which, acting against the rods D′ D′ E′ E′, connected with the segments B′ B′ C′ C′, raise and lower each set of hooks alternately. In the internal surface of the annulus O a vertical slot, $g$, is cut, (see Figs. 4 and 10,) which enters the cam-groove, and allows the projection on the end of the needles to pass into the groove, the plate being turned each time to bring the slot opposite the succeeding needle-groove. This slot is closed by a key. Q′ R′ are bobbins, on which the material to be knit is wound. The one, Q′, is held on a spindle attached to the table of the machine, while the other, R′, revolves on a spindle secured to the plate M, and consequently revolves with said plate around the needle-cylinder. S′ T′ are supports, to deliver the worsted from the bobbins to the needle-cylinder.

Figure 17:
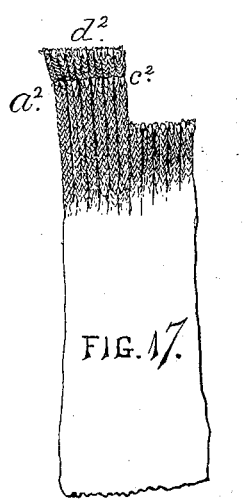
Figure 18:
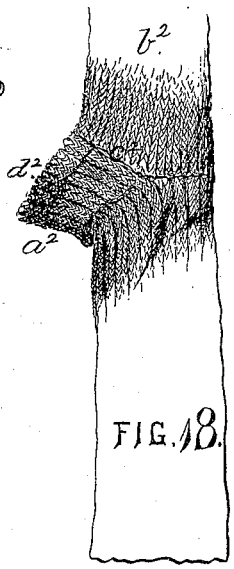

Figs. 17 and 18 represent the sock in two stages of construction. Fig. 17 shows the leg with the semicircular heel $a^2$. Fig. 18 represents it with the foot $b^2$ knit on.

It will be observed that the bottom $d^2$ of the heel is knit plain instead of ribbed, which will be referred to hereafter.

The various parts of the machine being constructed and arranged as described, they will operate as follows to knit a complete sock, with the exceptions before mentioned: The fabric is started upon the needle-cylinder in the usual manner, and, the catch-pin $j$ being connected with the continuously rotary ring L, the dial-catch $b^1$ inserted in the slot in the cross-piece $d^1$, and the hinged cam locked in its upright position against the cylinder, the machine, upon being operated, will knit the leg of the sock, which is ribbed. Sufficient length of leg having been knitted, the machine is stopped, either by hand or automatically; the catch-pin $j$ transferred from the inner to the outer hole of the plate M, where it will engage with the slot in the outer ring J; the swing-cam P unlocked and thrown down out of the way; the two stops U U moved in toward the plate M, and the stitches that are retained by the rear half of the needles of the dial $A^3$ transferred by a hook to the corresponding needles in the cylinder below. The machine in this condition is ready to knit a semicircle, and, upon operating it, a row of stitches is added to the heel at each reciprocation. At the end of each reciprocation the teat of the shifter T is brought in contact with the stops U U, and the cams R R in the annulus O reversed, in the manner before described.

By making reference to Fig. 11, the purpose and function of the cams R R will be understood. In machines for knitting continuously-circular work, the cams R R may be formed in one piece; but where a reciprocating motion is given them, so as to operate the needles in their backward as well as forward movement, they must of necessity be independent and capable of independent adjustment, for the following reasons:

Consider a needle stationed at Z on the annulus; on moving the plate M in the direction of the arrow $Z^1$, the annular cam of the annulus O will elevate the needle to its proper height, (the apex $x'$,) where the left-hand cam R will come in contact with, and depress it to the point $Z^2$, and the movement of the annulus will bring it into the groove $x'$. Reverse the motion of the plate M in the direction of the arrow $x'$, without changing the position of the cams R R, and the lower portion of the left-hand one will come in contact with the needle and stop the machine; but if the end of the groove were sloped off to meet the end of the cam, there would be no obstruction, and the needle would be carried down to the same point as it was when it passed the lower end of the cam R during the reverse rotation of the plate. This action of the needle, which is now charged with a stitch, would drag the latter (the stitch) over the sharp, abrupt edge of the needle-cylinder and break the yarn. The necessity for shifting the cams is now apparent. By raising the left-hand one and depressing the right, the needle is passed by the lower end of the cam without being sensibly depressed, and the stitch it retains runs no danger of being broken. The throw of these cams, which governs the length of the stitch, can be regulated by arranging the stops U U so as to make them come in contact with the shifter T either sooner or later, and thus operate it either more or less. The stops shown in the drawings are not of this arrangement, but any mechanic would readily be able to supply them.

Sufficient fabric having been knitted to form the upper portion of the heel, the latch of the cam $A^1$ is disconnected from the cross-piece $d^1$, and, the cam $A^1$ having been turned so as to draw in the needles immediately under the cross-piece $d^1$, the curved arm V and the dial are thrown back, and the knitting proceeded with, which knits the bottom of the heel plain, the upper needles having been dispensed with.

Previous to throwing up the dial $A^3$, the remaining stitches on its front needles must be transferred to the corresponding needles in the cylinder below. The stocking having been thus far completed, the cam P is again locked in its proper position, the catch-pin $j$ transferred to the ring L, the stops U U moved out of the path of the shifter T, and the yarn from the bobbin R' broken, and the machine turned half a revolution, which runs off the last stitches from that portion forming the heel, which is now complete. The two sides $c^2$, Fig. 17, of the selvage of the heel are then looped up on the needles from which the work has been run off, (the number of stitches in the two selvage sides equaling half the number of needles in the cylinder,) and the work is pressed down over the hooks $e'$ $e'$. The yarn from the bobbin Q' is now substituted for the other, and the knitting of the foot of the sock, which is plain, is proceeded with; which having been accomplished, the sock is taken from the machine, the bottom of the heel properly closed up, and the toe finished off, either by hand or on a special machine.

During the operation of knitting, the sock, which hangs down in the interior of the cylinder N, is advanced as fast as knit by the hooks $e'$ $e'$, which are operated through the agency of rods D' E', arms G' H', bars M' N', and cams J' K'.

I claim—

1. In combination with the cylinder N and dial $A^3$, the mechanism for giving a continuous circular and reciprocating semicircular motion to the plate M, consisting of the pinion K, ring L, rack G, pinions I and D, ring J, and stop $j$, constructed and operating in the manner described and set forth.

2. The mechanism for operating the dial-needles, consisting of the latch $b^1$, arch $d^1$, cam A, and plate M, constructed and operating substantially in the manner described and set forth.

3. The dial $A^3$, and its operative mechanism, applied upon a hinged arm, V, so that it can be readily removed out of the way, to facilitate the operation of the machine on different work, substantially in the manner described and set forth.

4. The combination, with the circular plate M, of the shifter T, hooks U U, and ring S, for operating the cams R R, constructed and operating substantially in the manner described and set forth.

5. In combination with the revolving plate M and toothed rings J L, the locking-pin $j$, for changing the movement of the machine, substantially in the manner described and set forth.

6. The reversing-hooks U U, in combination with the shifter T, constructed substantially in the manner described and shown.

7. A needle-cylinder containing two separate independent sets of needles, arranged as described, and operated by two separate independent cams, substantially in the manner and for the purpose described and specified.

BENJAMIN C. STEVENS.

Witnesses:
A. D. SANBORN,
G. H. ROBERTS.